United States Patent
Gehr

(10) Patent No.: US 6,453,395 B1
(45) Date of Patent: Sep. 17, 2002

(54) COPY BUTTON ON DRIVE

(75) Inventor: Rachel Gehr, Boulder, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/306,103

(22) Filed: May 6, 1999

(51) Int. Cl.[7] .............................................. G06F 12/00
(52) U.S. Cl. .................... 711/162; 369/47.12; 369/53.2; 369/53.21; 369/53.22; 369/84
(58) Field of Search ............................ 369/47.12, 53.2, 369/53.21, 53.22, 84; 711/162

(56) References Cited

U.S. PATENT DOCUMENTS

| | | | | |
|---|---|---|---|---|
| 5,146,369 A | * | 9/1992 | Yamaguchi ................... 360/15 |
| 5,214,627 A | * | 5/1993 | Nakashima et al. .......... 369/32 |
| 5,402,270 A | * | 3/1995 | McDonnell et al. .......... 360/15 |
| 5,473,584 A | * | 12/1995 | Oshima ........................ 369/32 |
| 5,610,893 A | * | 3/1997 | Soga et al. .................... 369/84 |
| 5,640,535 A | * | 6/1997 | Suzuki et al. ................ 711/170 |
| 5,668,789 A | * | 9/1997 | Yokota et al. ................ 369/47 |
| 5,694,381 A | * | 12/1997 | Sako ............................ 369/58 |
| 5,881,038 A | * | 3/1999 | Oshima et al. ............... 369/59 |
| 6,141,298 A | * | 10/2000 | Miller ........................... 369/30 |
| 6,246,655 B1 | * | 6/2001 | Miller .......................... 369/84 |

* cited by examiner

*Primary Examiner*—Do Hyun Yoo
*Assistant Examiner*—Mehdi Namazi

(57) ABSTRACT

A system for copying compact discs using read/write compact disc drives that have one or more copy buttons on their face and attached to a computer system is disclosed. In a one copy button read/write compact disc drive, pressing the copy button launches copy software that evaluates the computer system to determine the number of CD drives available, and evaluates any CDs inserted into any of the CD drives to determine their type and formatting. Based upon this information, the copy software then sends prompts to the user, guiding and directing the user to take the appropriate steps to complete the copy process. In a multiple copy button read/write compact disc drive, each of the copy buttons has a different function. One copy button could be used for copying music CDs. Another copy button could be used for copying data CDs. The copy software is launched by either copy button.

17 Claims, 15 Drawing Sheets

COPY BUTTON ON DRIVE

TECHNICAL FIELD

This invention relates to read/write compact disc drives, and more particularly to copying compact discs using read/write compact disc drives. Even more particularly, the invention relates to an automatic way of copying compact discs using read/write compact disc drives having one or more copy buttons on the read/write compact disc drives.

BACKGROUND OF THE INVENTION

In order to copy a compact disc, or CD, a computer user having a read/write compact disc drive currently needs to launch formatting software as well as the software that copies the data from the CD containing the desired data (the master CD) to the blank CD, or target CD. It is oftentimes confusing to computer users to know which software to use as well as which type of blank media is appropriate for the task. Computer users are also often confused about the types of data contained on CDs, and which CDs are compatible with which CD drives that they may have access to on their computer system.

It is thus apparent that there is a need in the art for an improved method or apparatus which would automate the CD copying process and reduce the amount of knowledge and action required on the part of the user. There is also a need in the art to utilize a copying paradigm that is familiar to the user and that is simpler than current practices. The present invention meets these and other needs in the art.

SUMMARY OF THE INVENTION

It is an aspect of the present invention to place one or more copy buttons on a read/write compact disc drive.

It is another aspect of the invention to launch copy software to handle the formatting and copying of a CD when a copy button on a read/write compact disc drive is pressed.

Yet another aspect of the invention is to determine how many compact disc drives are available in a computer system when the copy software is launched.

Still another aspect of the invention is to determine the types of compact disc drives that are in a computer system when the copy software is launched.

A further aspect of the invention is to use the copy software launched by pressing a copy button on a read/write compact disc drive to prompt a user to take specific action in the copying process.

A still further aspect of the invention is to allow multiple copies of a CD to be made in the copying process utilizing the copy software launched by pressing a copy button on a read/write compact disc drive.

Another aspect of the invention is, based upon which button of a multiple button read/write compact disc drive is pressed, to copy a CD with formatting corresponding to the type of button pressed.

The above and other aspects of the invention are accomplished in a read/write compact disc drive attached to a computer system that has one or more copy buttons on its face. In a one copy button read/write compact disc drive, pressing the copy button launches copy software that evaluates the computer system to determine the number of CD drives available in the computer system, and evaluates any CDs inserted into any of the CD drives to determine their type and formatting. Based upon this information, the copy software then sends prompts to the user, guiding and directing the user to take the appropriate steps to complete the copy process.

In a multiple copy button read/write compact disc drive, each of the copy buttons has a different function. One copy button could be used for copying music CDs. Another copy button could be used for copying data CDs. Another copy button could be used for copying enhanced CDs or Digital VideoDiscs (DVD) which contain mixed types of information, such as digital audio, data, still video, full-motion video, text, graphics, or animated graphics. Depending upon which copy button was pushed, the copy software launched by the particular copy button would send prompts to the user, guiding and directing the user to take the appropriate steps to complete the copying process.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
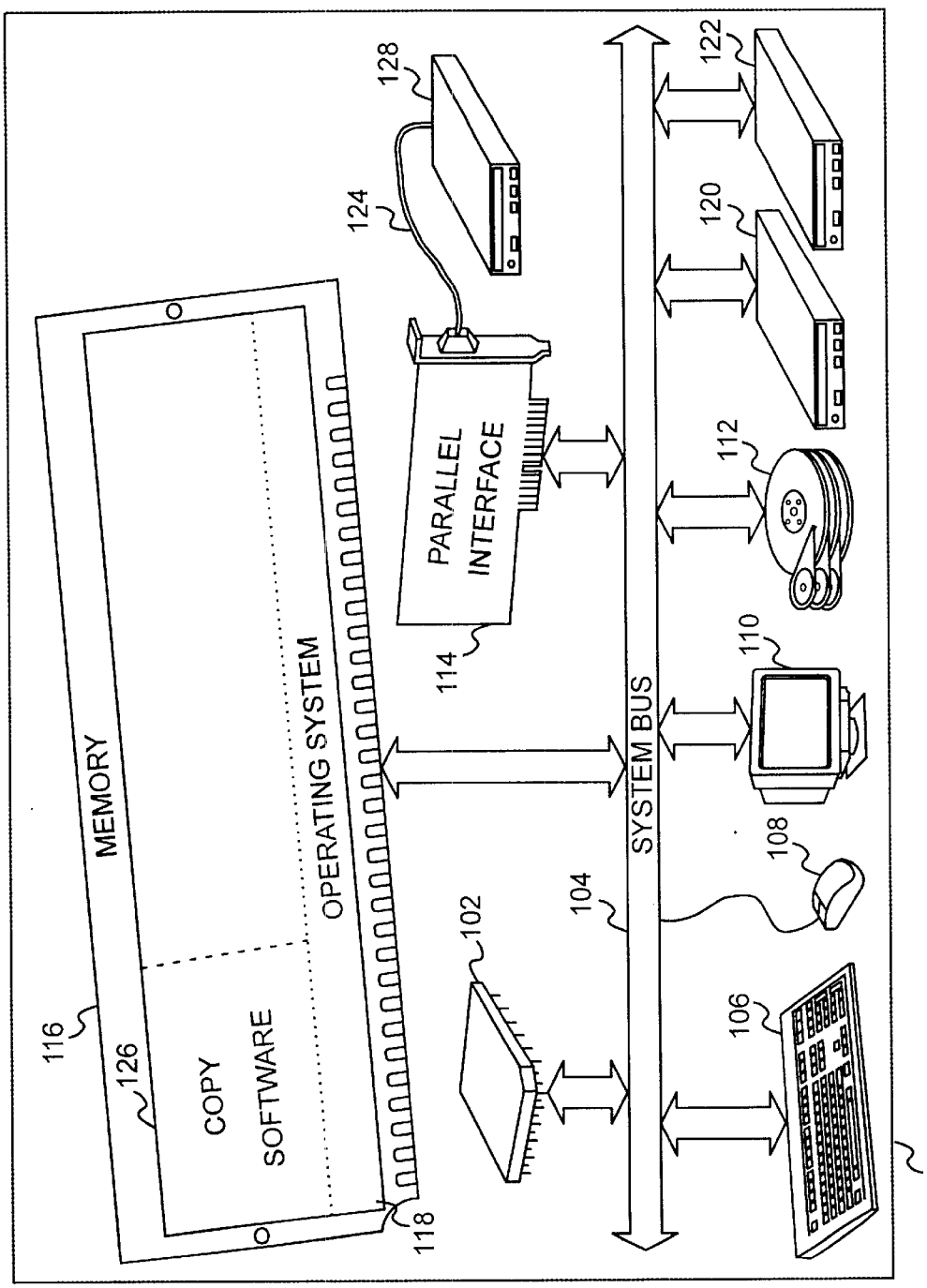
FIG. 1 shows a block diagram of a computer system having multiple CD drives, at least one of which is a read/write compact disc drive.

FIG. 1 shows a block diagram of a computer system having multiple CD drives, at least one of which is a read/write compact disc drive. Referring now to FIG. 1, computer system 100 contains a processing element 102. Processing element 102 communicates with other elements of computer system 100 over a system bus 104. A keyboard 106 allows a user to input information into computer system 100 and a graphics display 110 allows computer system 100 to output information to the user. A graphical input device 108, usually a mouse, is also used to input information. Storage device 112 is used to store data and programs within computer system 100. A memory 116, also attached to system bus 104, contains an operating system 118, and copy software 126 of the present invention.

Attached to system bus 104 is internal CD drive 120 and internal CD drive 122. Parallel interface 114, also connected to system bus 104, is connected by cable 124 to external CD drive 128. One skilled in the art will recognize that computer system 100 could have only one internal CD drive and no external CD drives, or have one external CD drive and no internal CD drives, or any of a number of different combinations of internal and external CD drives. Whether there are one or more CD drives in computer system 100, at least one must be a read/write compact disc drive.

Figure 2:
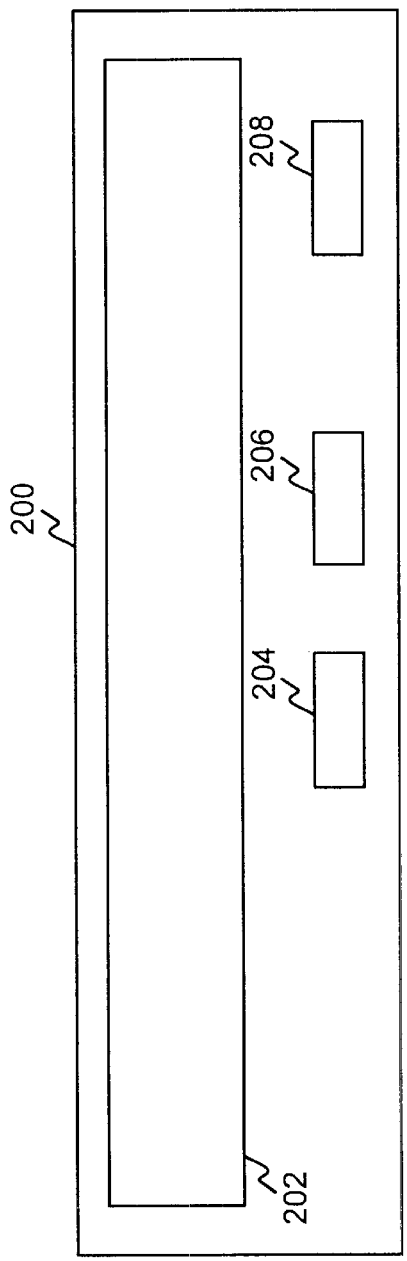
FIG. 2 shows a representation of the face of a read/write compact disc drive having two copy buttons.

FIG. 2 shows a representation of the face of a read/write compact disc drive having two copy buttons. Referring now to FIG. 2, face 200 of a CD drive could be the face of internal CD drive 120, internal CD drive 122, or external CD drive 128 FIG. 1). Door 202 when opened allows a tray (not shown in FIG. 2) to extend from within the CD drive to receive a CD (also not shown in FIG. 2). Copy button 204 is used for copying music CDs. Pressing copy button 204 will launch copy software 126 (FIG. 1). Copy button 206 is used for copying data CDs. In an alternative embodiment of the invention, copy button 206 is used for copying enhanced CDs. Pressing copy button 206 will also launch copy software 126. One skilled in the art will recognize that based upon which copy button is pressed by the user and the types of CD media inserted into the CD drives, copy software 126, in different embodiments of the invention, may or may not make different assumptions about the user's intent, and thus present the user with different prompts to complete the copy process. Eject button 208 when pressed causes door 202 to open and the tray within the CD drive extends out to allow insertion or removal of a CD from the tray.

Figure 3:
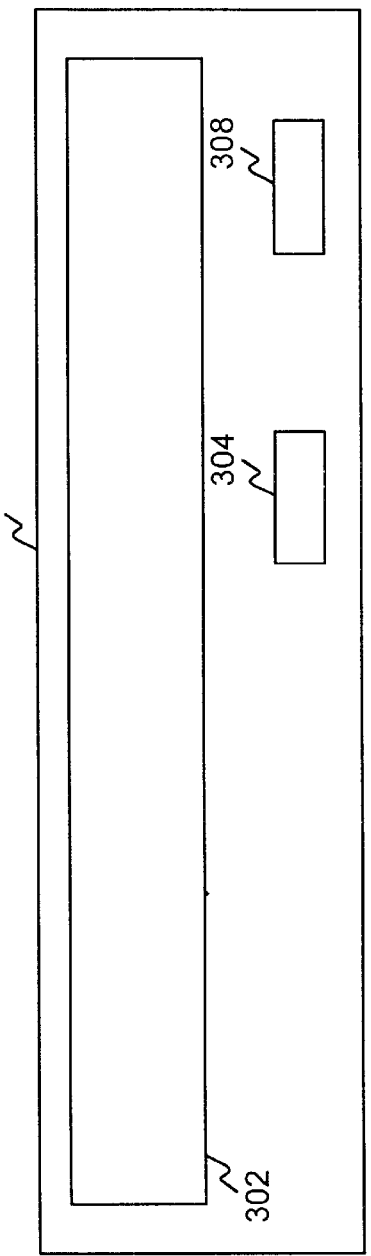
FIG. 3 shows a block diagram of the face of a read/write compact disc drive having one copy button, which is the preferred embodiment of the invention.

FIG. 3 shows a block diagram of the face of a read/write compact disc drive having one copy button, which is the preferred embodiment of the invention. Referring now to FIG. 3, face 300 of a CD drive could be the face of internal CD drive 120, internal CD drive 122, or external CD drive 128 (FIG. 1). Door 302 when opened allows a tray (not shown in FIG. 3) to extend from within the CD drive to receive a CD (also not shown in FIG. 3). Copy button 304 is used for copying a CD. Pressing copy button 304 will launch copy software 126 (FIG. 1). One skilled in the art will recognize that based upon the type of CD media inserted into the CD drive, copy software 126, in different embodiments of the invention, may or may not make different assumptions about the user's intent, and thus present the user with different prompts to complete the copy process. Eject button 308 when pressed causes door 302 to open and the tray within the CD drive extends out to allow insertion or removal of a CD from the tray.

Figure 4:
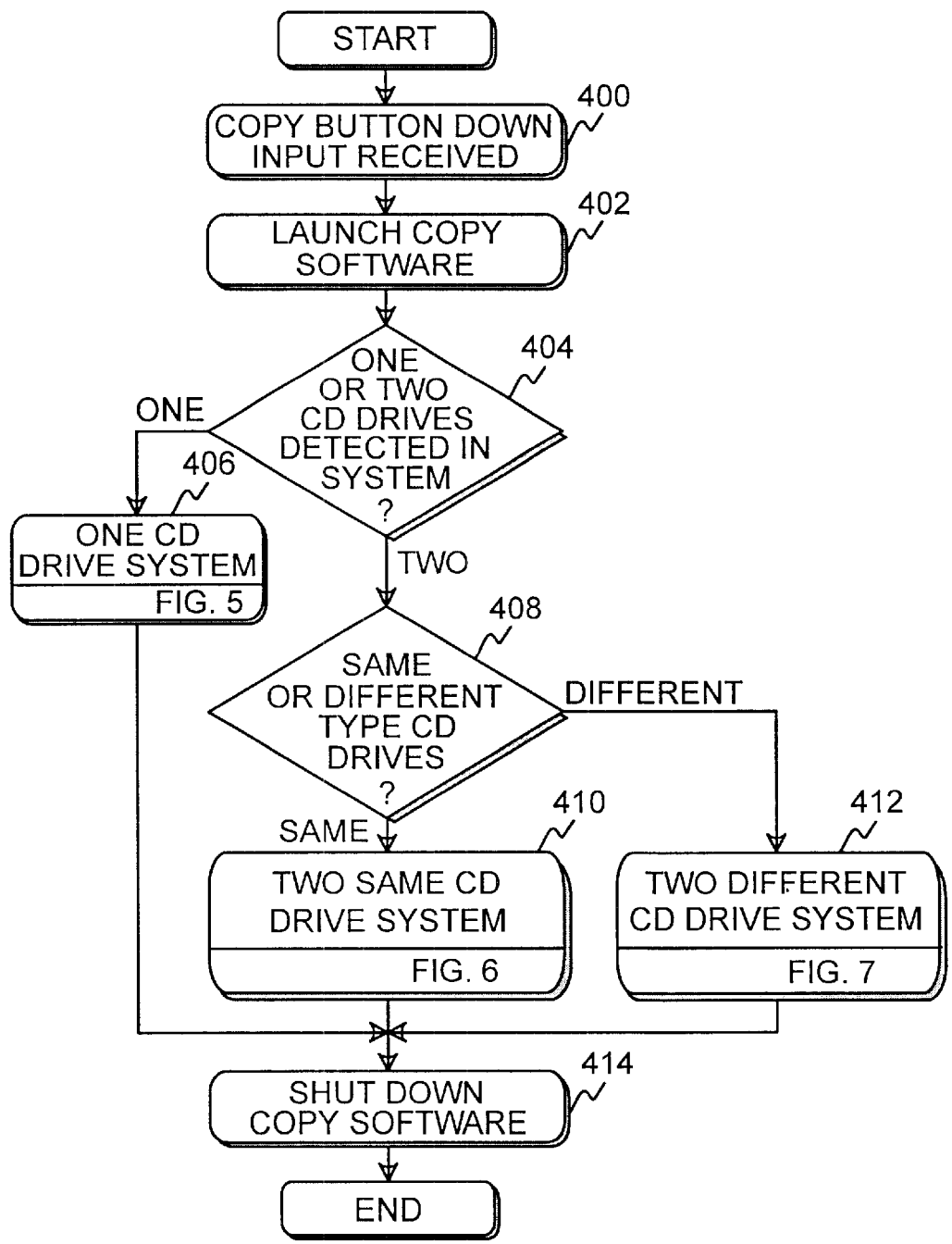
FIG. 4 shows a flowchart of the copying process initiated by pressing a copy button on the face of a read/write compact disc drive.

FIG. 4 shows a flowchart of the copying process initiated by pressing a copy button on the face of a read/write compact disc drive. Referring now to FIG. 4, in step 400 copy button down input is received in operating system 118 of computer system 100 (FIG. 1) from a copy button being pressed on a read/write compact disc drive, such as copy button 204 or 206 (FIG. 2), or copy button 304 (FIG. 3), which may be located on internal CD drive 120, internal CD drive 122, or external CD drive 128. Operating system 118 launches copy software 126 in step 402. One skilled in the art will recognize that based upon which copy button is pressed by the user and the types of CD media inserted into the CD drives, copy software 126, in different embodiments of the invention, may or may not make different assumptions about the user's intent, and thus present the user with different prompts to complete the copy process. In step 404 copy software 126 determines if there are other read/write compact disc drives that are present within computer system 100. By way of example only and for simplicity, the number of read/write compact disc drives in FIG. 4 is limited to two. One skilled in the art will recognize that the description outlined in FIG. 4 is applicable to computer systems having more than two CD drives. If only one CD drive is detected in step 404, then step 406 calls FIG. 5 for a one CD drive system. Upon returning from FIG. 5, control passes to step 414.

If step 404 determines that there are two read/write compact disc drives that are present within computer system 100, then step 408 determines if the CD drives are the same or different in regards to the type of CDs that they can read. For example, if both CD drives are CD-ROM drives, they both can read CD-DA (Compact Disc-Digital Audio) and CD-ROM (Compact Disc-Read Only Memory) formatted discs. Or, one of the CD drives may be able to read CD-ROM XA (Compact Disc-Read Only Memory Extended Architecture) formatted discs and the other one cannot. Or, one of the CD drives may be able to read a DVD and the other one cannot. If step 408 determines that the two CD drives can read the same CDs or DVDs, then step 410 calls FIG. 6 for a same CD drive system. Upon returning from FIG. 6, control passes to step 414. If step 408 determines that the two CD drives are different and cannot read the same CDs or DVDs, then step 412 calls FIG. 7 for a different CD drive system. Upon returning from FIG. 7, control passes to step 414. In step 414, copy software 126 is shut down, and control returns to operating system 118.

Figure 5A:
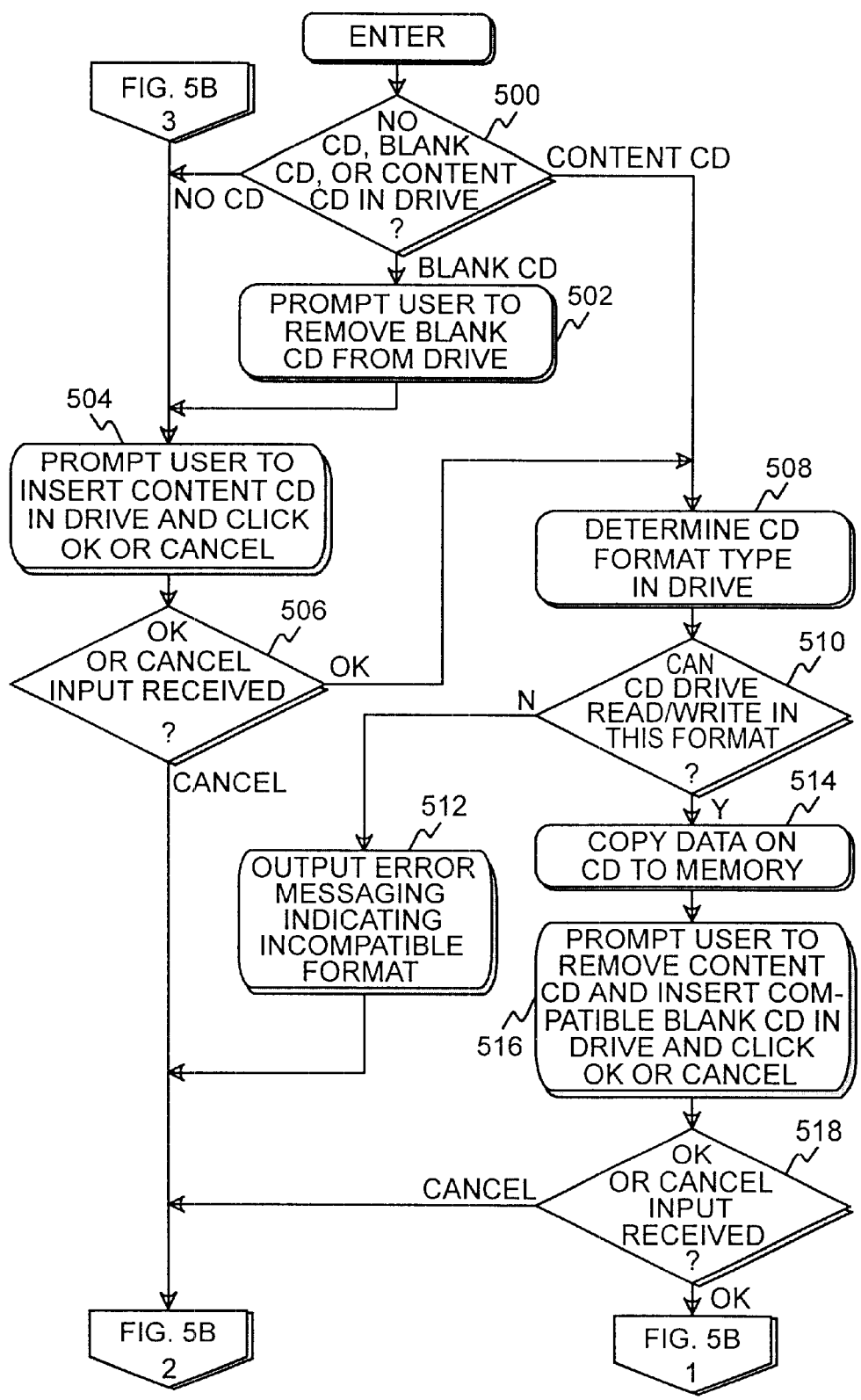
FIGS. 5A and 5B show a flowchart of the copying process in a computer system having one read/write compact disc drive.
Figure 5B:
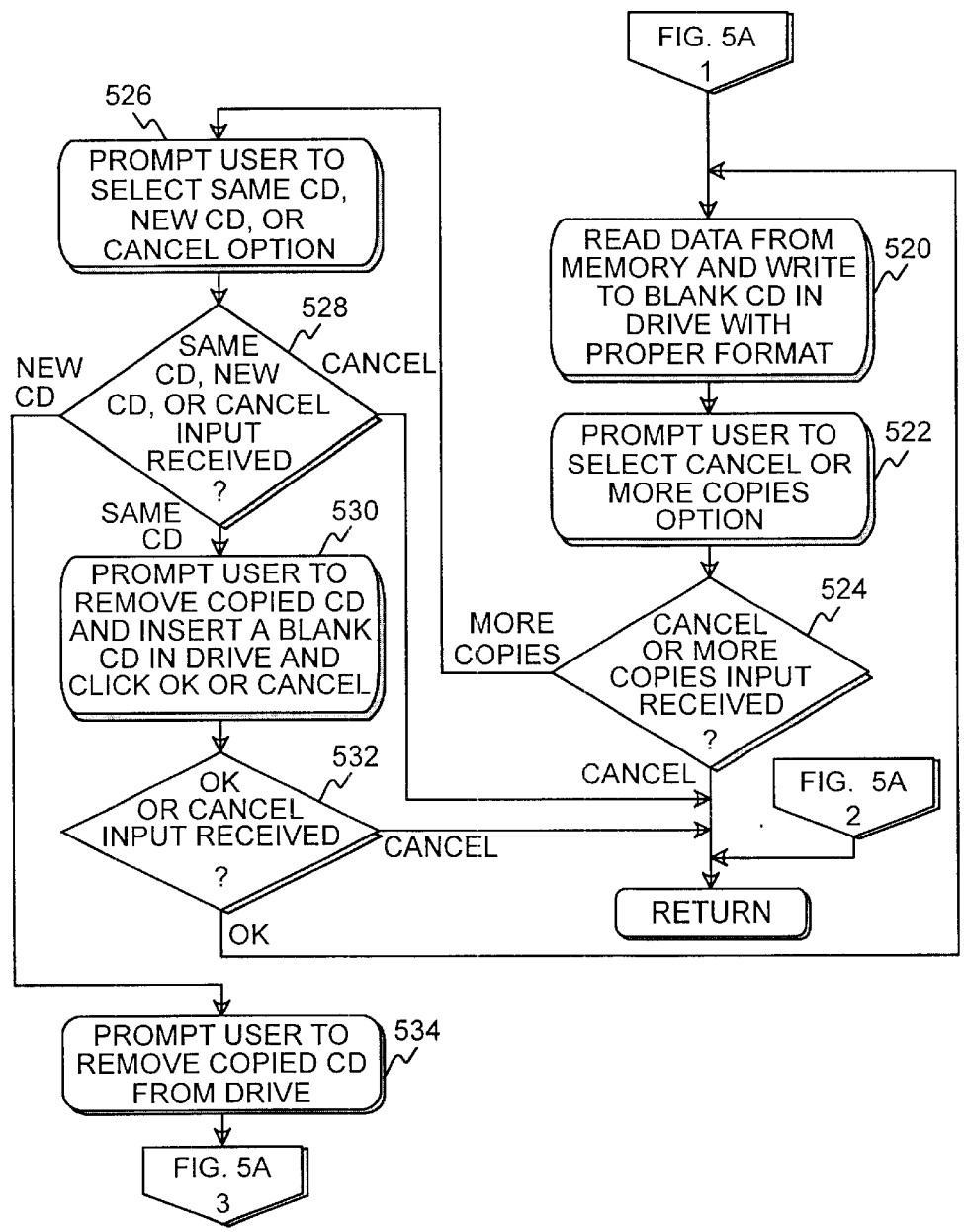

FIGS. 5A and 5B show a flowchart of the copying process in a computer system having one read/write compact disc drive. Referring now to FIGS. 5A and 5B, the one CD drive may be internal CD drive 120, internal CD drive 122, or external CD drive 128 (FIG. 1). Step 500 determines if there is no CD, a blank CD, or a content CD already inserted into the CD drive. A blank CD is a formatted CD or DVD with no data. One skilled in the art will recognize that an unformatted CD may have to be formatted prior to writing unless the CD drive formats on the fly when writing to the CD. A content CD is a CD or DVD that has some type of data, such as digital audio, data, still video, full-motion video, text, graphics, or animated graphics, or a combination of several types of data.

If a content CD is detected in step 500, then control also passes to step 508. If a blank CD is detected in step 500, then step 502 sends a prompt for display on graphics display 110 instructing the user to remove the blank CD from the CD drive. Control then passes to step 504. If no CD is detected in step 500, then control passes to step 504.

Step 504 sends a prompt for display on graphics display 110 instructing the user to insert a content CD into the CD drive and click on an OK option or a cancel option with graphical input device 108 (FIG. 1). One skilled in the art will recognize that in many of the steps shown in FIGS. 5A and 5B, many opportunities for the user to click on a cancel option and exit copy software 126 are possible, but only a few are shown in FIGS. 5A and 5B for simplicity. Step 506 determines if OK input or cancel input is received. If cancel input is received, then control returns to operating system 118 (FIG. 1). If OK input is received in step 506, then control passes to step 508.

Step 508 determines the formatting for the data stored on the CD in the CD drive. Step 510 then determines if the CD drive is capable of reading and writing data in the formats determined in step 508. If the answer is no, then step 512 sends an error message for display on graphics display 110 indicating to the user that the CD has incompatible formatting, and control then returns to operating system 118. If the answer in step 510 is yes, then in step 514 copy software 126 reads the data on the CD and copies the data to memory 116 (FIG. 1).

After the copying is complete, step 516 sends a prompt for display on graphics display 110 instructing the user to remove the content CD and insert a compatible blank CD into the CD drive and click on an OK option or a cancel option with graphical input device 108. Step 518 determines if OK input or cancel input is received. If cancel input is received, control returns to operating system 118. If OK input is received in step 518, then in step 520 (FIG. 5B) copy software 126 reads the data from memory 116 and writes the data to the blank CD with the proper formats.

Step 522 sends a prompt for display on graphics display 110 instructing the user to select a cancel or more copies option. Step 524 determines if cancel input or more copies input is received. If cancel input is received, control returns to operating system 118. If more copies input is received in step 524, a prompt is sent for display on graphics display 110 in step 526 instructing the user to select the same CD, a new CD, or a cancel option. Step 528 determines if same CD input, new CD input, or cancel input is received. If same CD input is received in step 528, then step 530 sends a prompt for display on graphics display 110 instructing the user to remove the copied CD and insert a compatible blank CD into the CD drive and click on an OK option or a cancel option. Step 532 determines if OK input or cancel input is received. If OK input is received in step 532, then control returns to step 520 where copy software 126 reads the data still in memory 116 from step 514, and writes the data to the blank CD with the proper formats.

If new CD input is received in step 528, step 534 sends a prompt for display on graphics display 110 instructing the user to remove the copied CD from the CD drive. Control then returns to step 504 where a prompt is sent for display on graphics display 110 instructing the user to insert a content CD into the CD drive and click on an OK option or a cancel option. If cancel input is received is received in step 532, control returns to operating system 118.

FIGS. 6A, 6B, 6C, and 6D show a flowchart of the copying process in a computer system having two CD drives where the CD drives can read the same format type of compact disc and at least one is a read/write compact disc drive. Referring now to FIGS. 6A, 6B, 6C, and 6D, the two CD drives may both be internal drives, external drives, or one internal drive and one external drive as shown in computer system 100 (FIG. 1). Step 600 determines if there is no CD, a blank CD, or a content CD already inserted into the CD drive which sent the copy button down input, referred to as the first CD drive. If no CD is detected in step 600, then step 602 determines if there is no CD, a blank CD, or a content CD already inserted into the second CD drive. If no CD is detected in the second drive in step 602, then step 606 sends a prompt for display on graphics display 110 instructing the user to insert a content CD, now referred to as the master CD, into the first drive, now referred to as the master drive, and to insert a blank CD, now referred to as the copy CD, into the second drive, now referred to as the copy drive, and then click on an OK option or a cancel option. Control then passes to step 616.

If a content CD is detected in the second drive in step 602, then step 604 sends a prompt for display on graphics display 110 instructing the user to insert a blank CD, now referred to as the copy CD, into the first drive, now referred to as the copy drive, and then click on an OK option or a cancel option. Control then passes to step 616.

If a blank CD is detected in the second drive in step 602, then step 608 sends a prompt for display on graphics display 110 instructing the user to insert a content CD, now referred to as the master CD, into the first drive, now referred to as the master drive, and then click on an OK option or a cancel option. Control then passes to step 616.

If a blank CD is detected in step 600, then step 610 determines if there is no CD, a blank CD, or a content CD already inserted into the second CD drive. If no CD is detected in the second drive in step 610, then step 612 sends a prompt for display on graphics display 110 instructing the user to insert a content CD, now referred to as the master CD, into the second drive, now referred to as the master drive, and then click on an OK option or a cancel option. Control then passes to step 616.

Figure 6A:
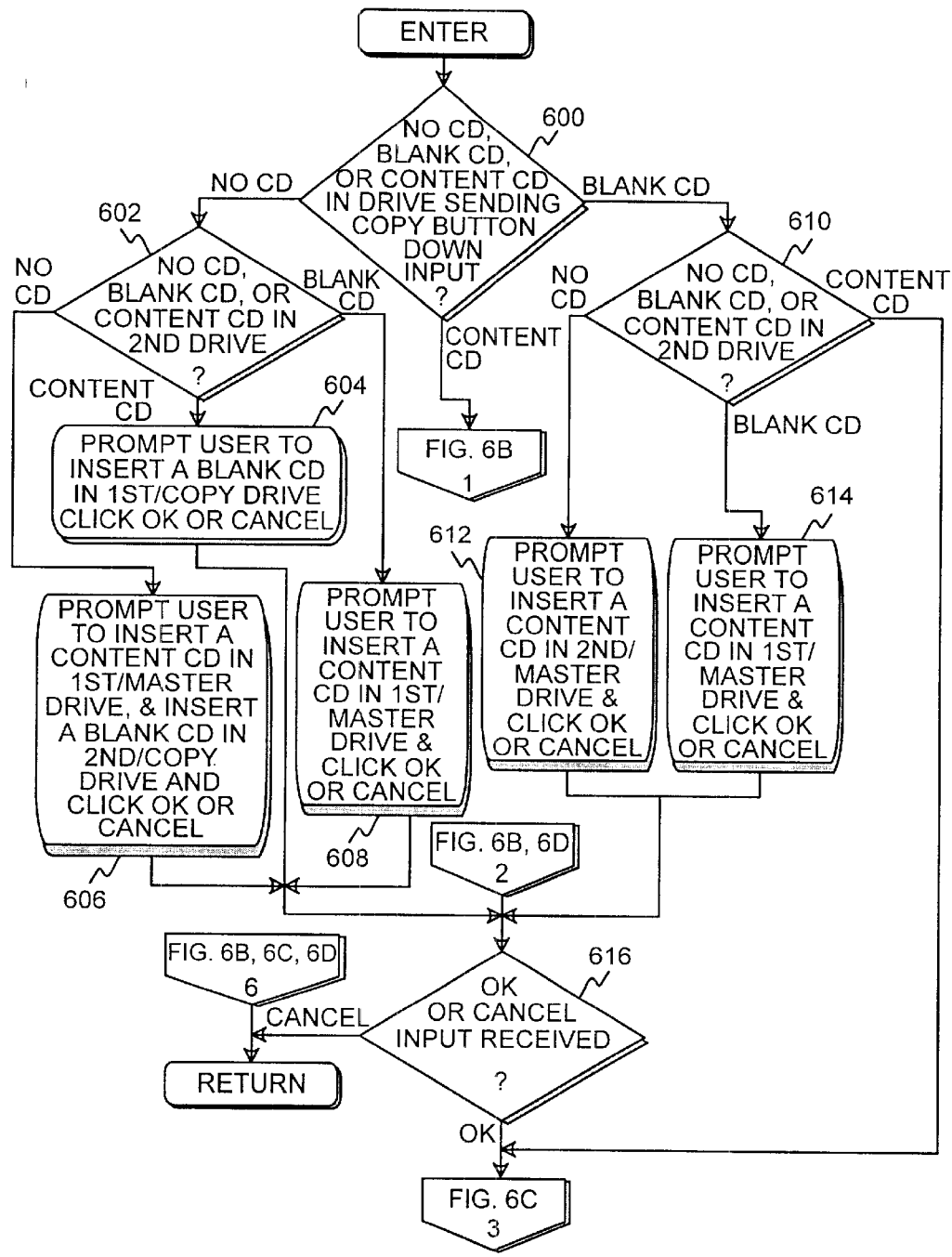
FIGS. 6A, 6B, 6C, and 6D show a flowchart of the copying process in a computer system having two CD drives where the CD drives can read the same format type of compact disc and at least one is a read/write compact disc drive.
Figure 6B:
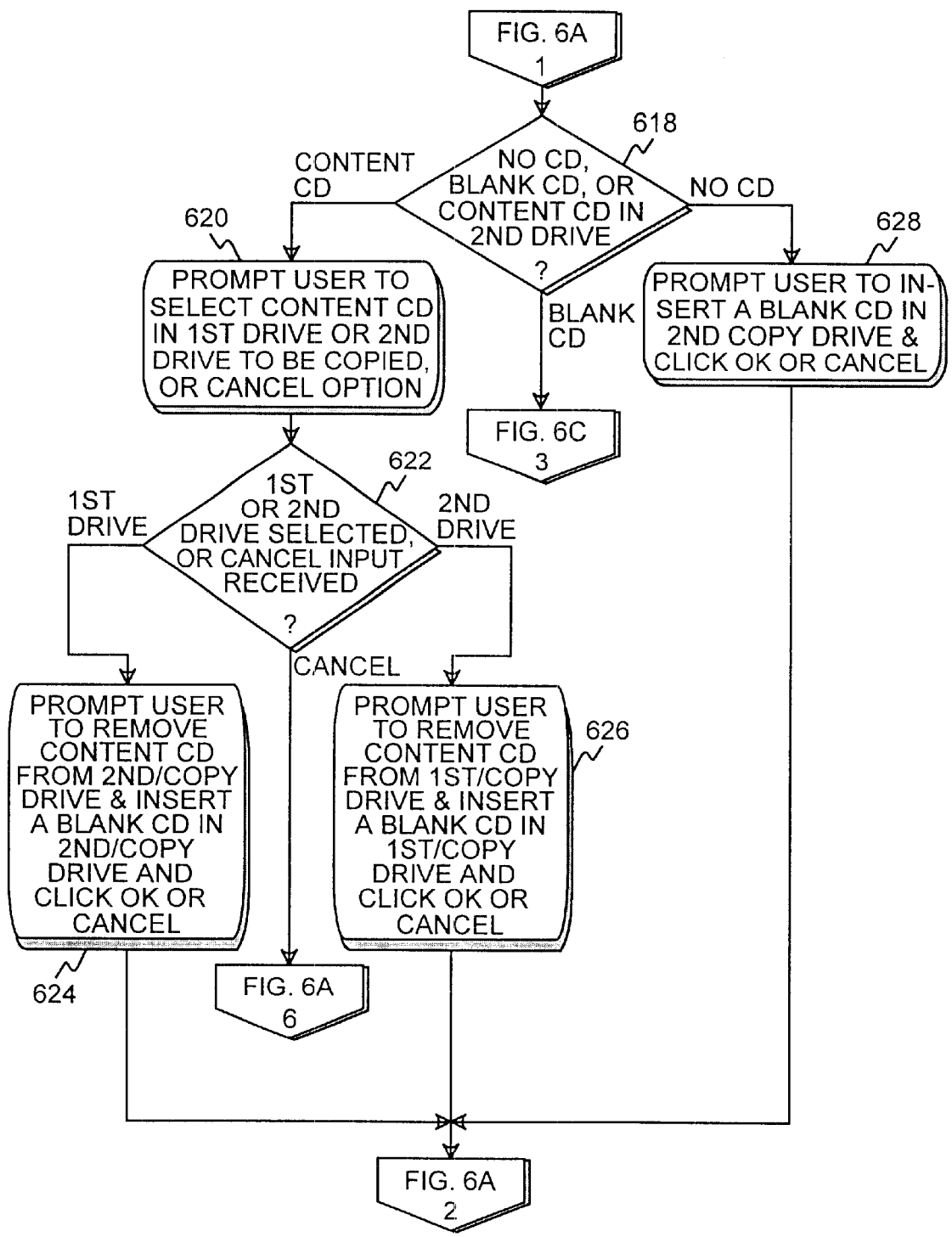
Figure 6C:
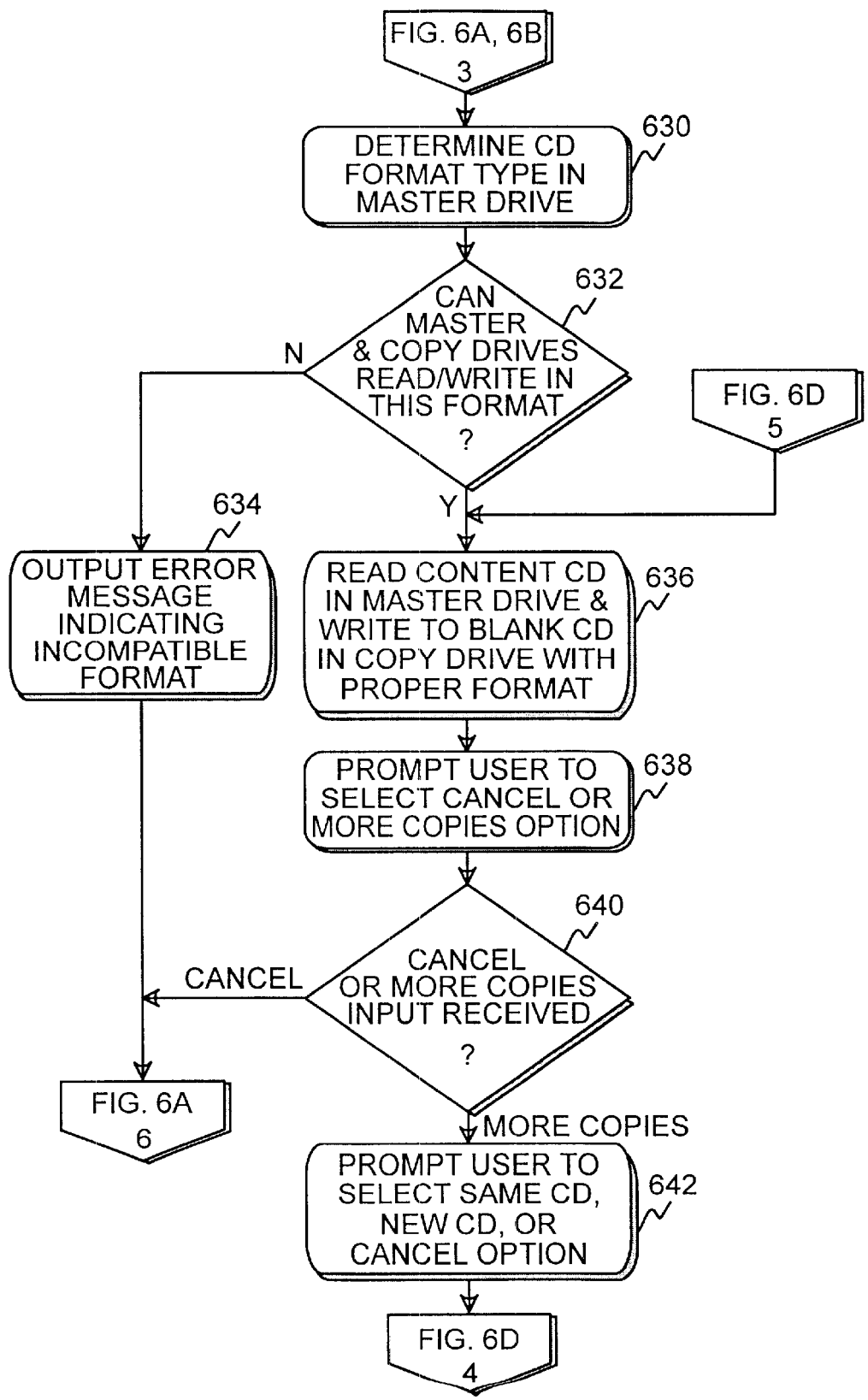
Figure 6D:
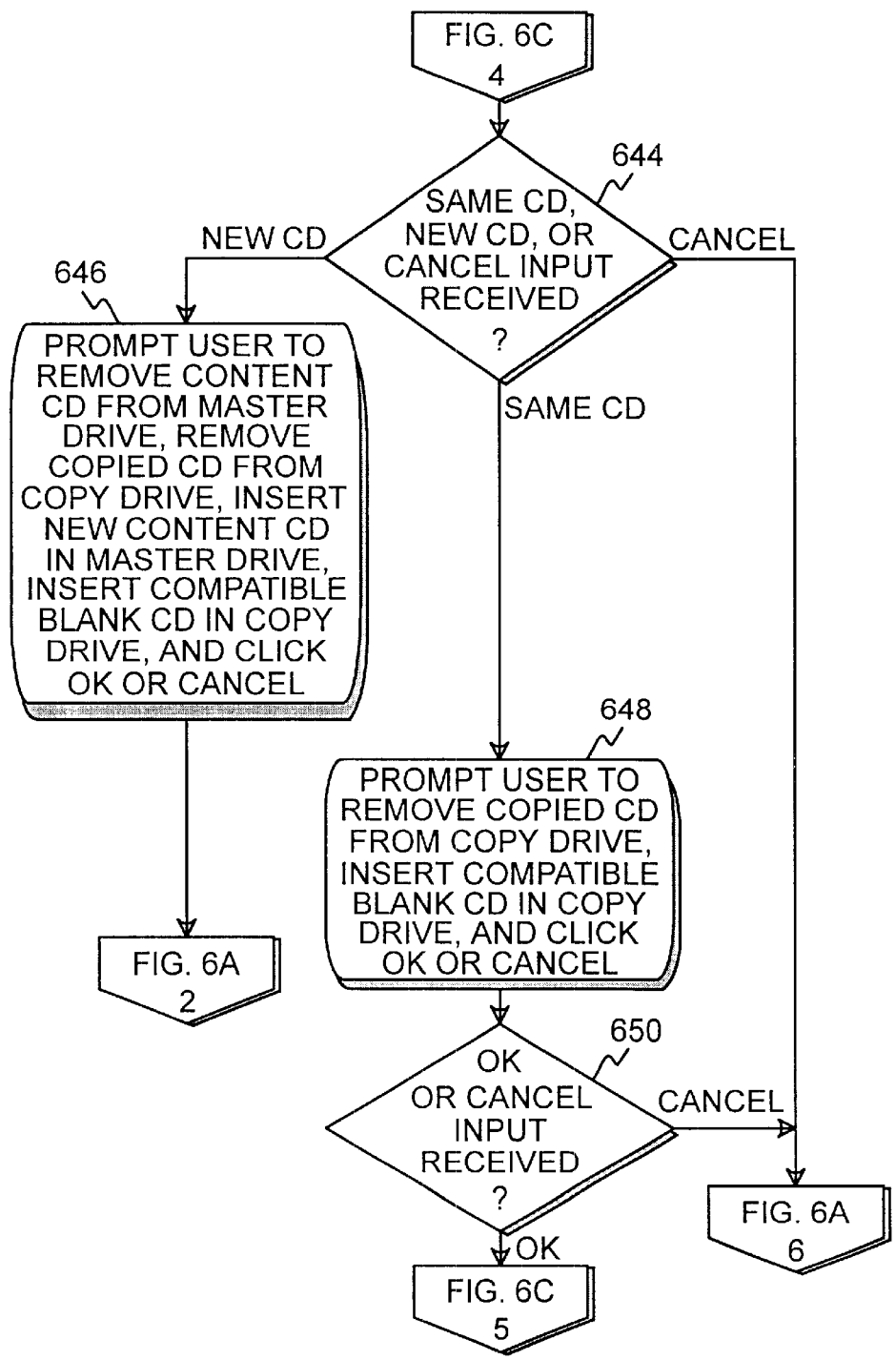

If a blank CD is detected in the second drive in step 610, then step 614 sends a prompt for display on graphics display 110 instructing the user to insert a content CD, now referred to as the master CD, into the first drive, now referred to as the master drive, and then click on an OK option or a cancel option. Control then passes to step 616. If a content CD, now referred to as the master CD, is detected in the second drive, now referred to as the master drive, in step 610, control then passes to step 630 (FIG. 6C).

If a content CD is detected in step 600, then step 618 (FIG. 6B) determines if there is no CD, a blank CD, or a content CD already inserted into the second CD drive. If a blank CD is detected in the second CD drive in step 618, the second CD drive is now referred to as the copy drive and the blank CD is referred to as the copy CD, and the first CD drive is referred to as the master drive and the content CD is referred to as the master CD. Control then passes to step 630 (FIG. 6C). If no CD is detected in the second drive in step 618, then step 628 sends a prompt for display on graphics display 110 instructing the user to insert a blank CD, now referred to as the copy CD, into the second drive, now referred to as the copy drive, and then click on an OK option or a cancel option. Control then passes to step 616 (FIG. 6A).

If a content CD is detected in the second drive in step 618, then step 620 sends a prompt for display on graphics display 110 instructing the user to select the content CD in the first drive to be copied, or the content CD in the second drive to be copied, or a cancel option. Step 622 determines if first drive input, second drive input, or cancel input is received. If first drive input is received in step 622, then step 624 sends a prompt for display on graphics display 110 instructing the user to remove the content CD from the second drive, now referred to as the copy drive, and to insert a blank CD, now referred to as the copy CD, into the copy drive, and then click on an OK option or a cancel option. Control then passes to step 616 (FIG. 6A).

If second drive input is received in step 622, then step 626 sends a prompt for display on graphics display 110 instructing the user to remove the content CD from the first drive, now referred to as the copy drive, and to insert a blank CD, now referred to as the copy CD, into the copy drive, and then click on an OK option or a cancel option. Control then passes to step 616 (FIG. 6A). If cancel input is received in step 622, then control returns to operating system 118 (FIG. 1). One skilled in the art will recognize that in many of the steps shown in FIGS. 6A, 6B, 6C, and 6D, many opportunities for the user to click on a cancel option and exit copy software 126 are possible, but only a few are shown in FIGS. 6A, 6B, 6C, and 6D for simplicity.

Step 616 (FIG. 6A), which may be reached from steps 606, 608, 612, 614, 624, 626, 628, or 646, determines if OK input or cancel input is received. If cancel input is received, control returns to operating system 118. If OK input is received in step 616, then step 630 (FIG. 6C), which may also be reached from steps 610 (FIG. 6A) and 618 (FIG. 6B), determines the formatting for the data stored on the master CD in the master drive. Step 632 then determines if the master drive and the copy drive are capable of reading and writing data in the formats determined in step 630. If the answer is no, then step 634 sends an error message for display on graphics display 110 indicating to the user that the CD has incompatible formatting, and control then returns to operating system 118. If the answer in step 632 is yes, then in step 636 copy software 126 reads the data on the master CD in the master drive and writes the data to the copy CD in the copy drive with the proper formats.

Step 638 sends a prompt for display on graphics display 110 instructing the user to select a cancel or more copies option. Step 640 determines if cancel input or more copies input is received. If cancel input is received, control returns to operating system 118. If more copies input is received in step 640, a prompt is sent for display on graphics display 110 in step 642 instructing the user to select the same CD, a new CD, or a cancel option. Step 644 (FIG. 6D) determines if same CD input, new CD input, or cancel input is received. If same CD input is received in step 644, then step 648 sends a prompt for display on graphics display 110 instructing the user to remove the copy CD from the copy drive and insert a compatible blank CD into the copy drive and click on an OK option or a cancel option. Step 650 determines if OK input or cancel input is received. If OK input is received in step 650, then control returns to step 636 where copy software 126 reads the data on the master CD in the master drive and writes the data to the copy CD in the copy drive with the proper formats. If cancel input is received in step 650, then control returns to operating system 118.

If new CD input is received in step 644, step 646 sends a prompt for display on graphics display 110 instructing the user to remove the master CD from the master drive, remove the copy CD from the copy drive, insert a new content CD, now referred to as the master CD, in the master drive, insert a compatible blank CD, now referred to as the copy CD, in the copy drive, and then click on an OK option or a cancel option. Control then returns to step 616 to determine if OK input or cancel input is received. If cancel input is received is received in step 644, control returns to operating system 118.

Figure 7A:
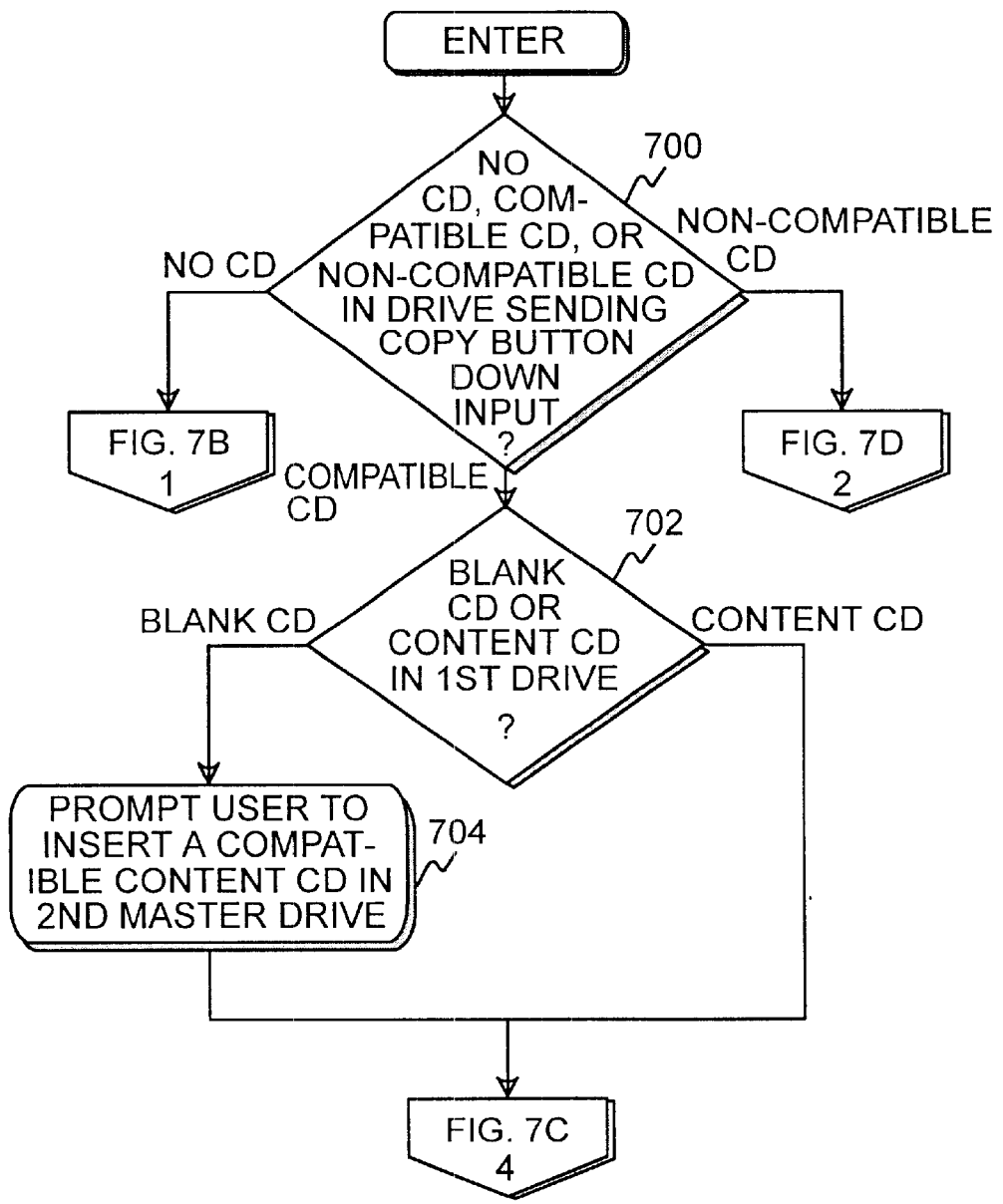
FIGS. 7A, 7B, 7C, 7D, 7E, 7F, and 7G show a flowchart of the copying process in a computer system having two CD drives where the CD drives cannot read the same format type of compact discs and at least one is a read/write compact disc drive.
Figure 7B:
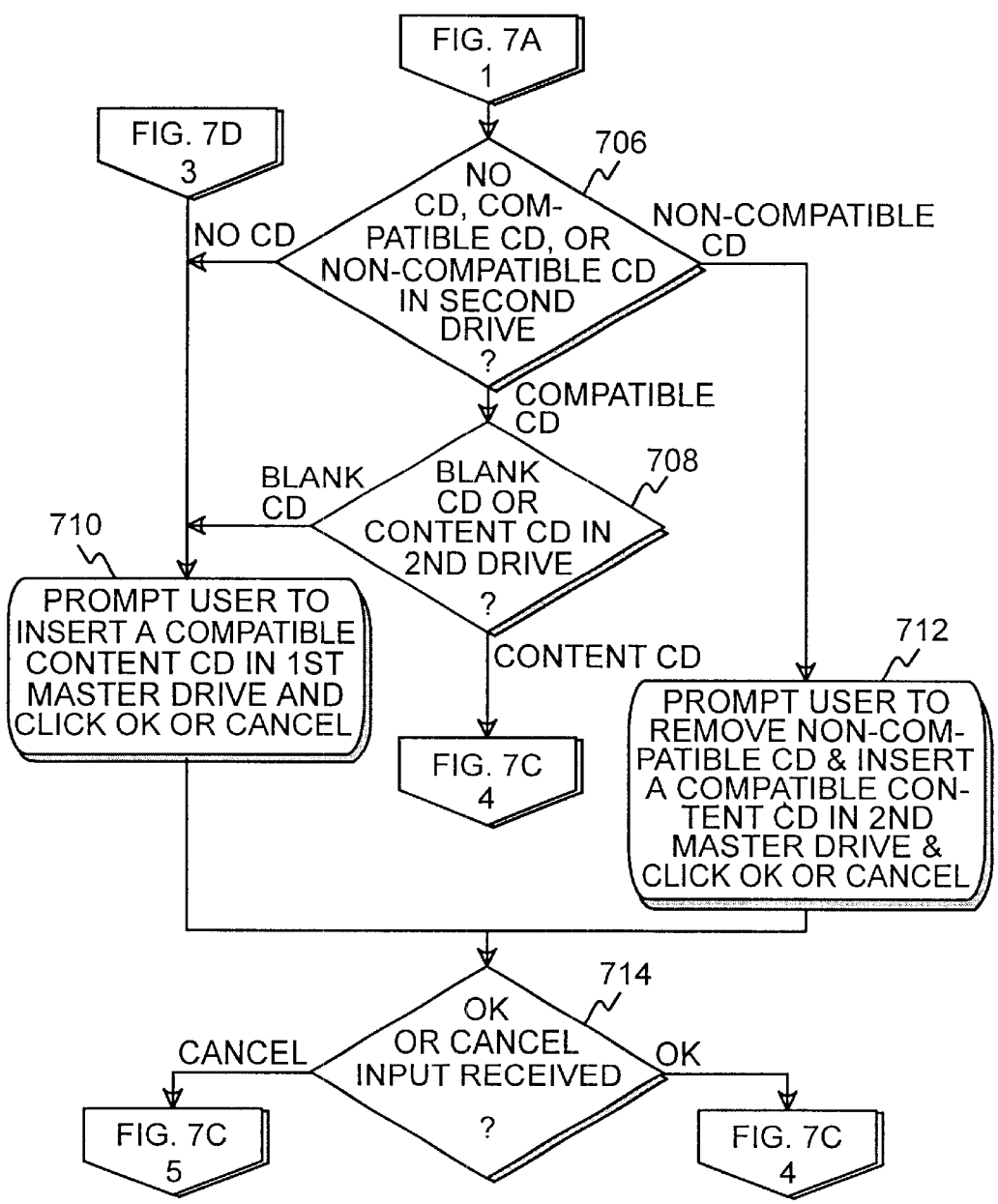
Figure 7C:
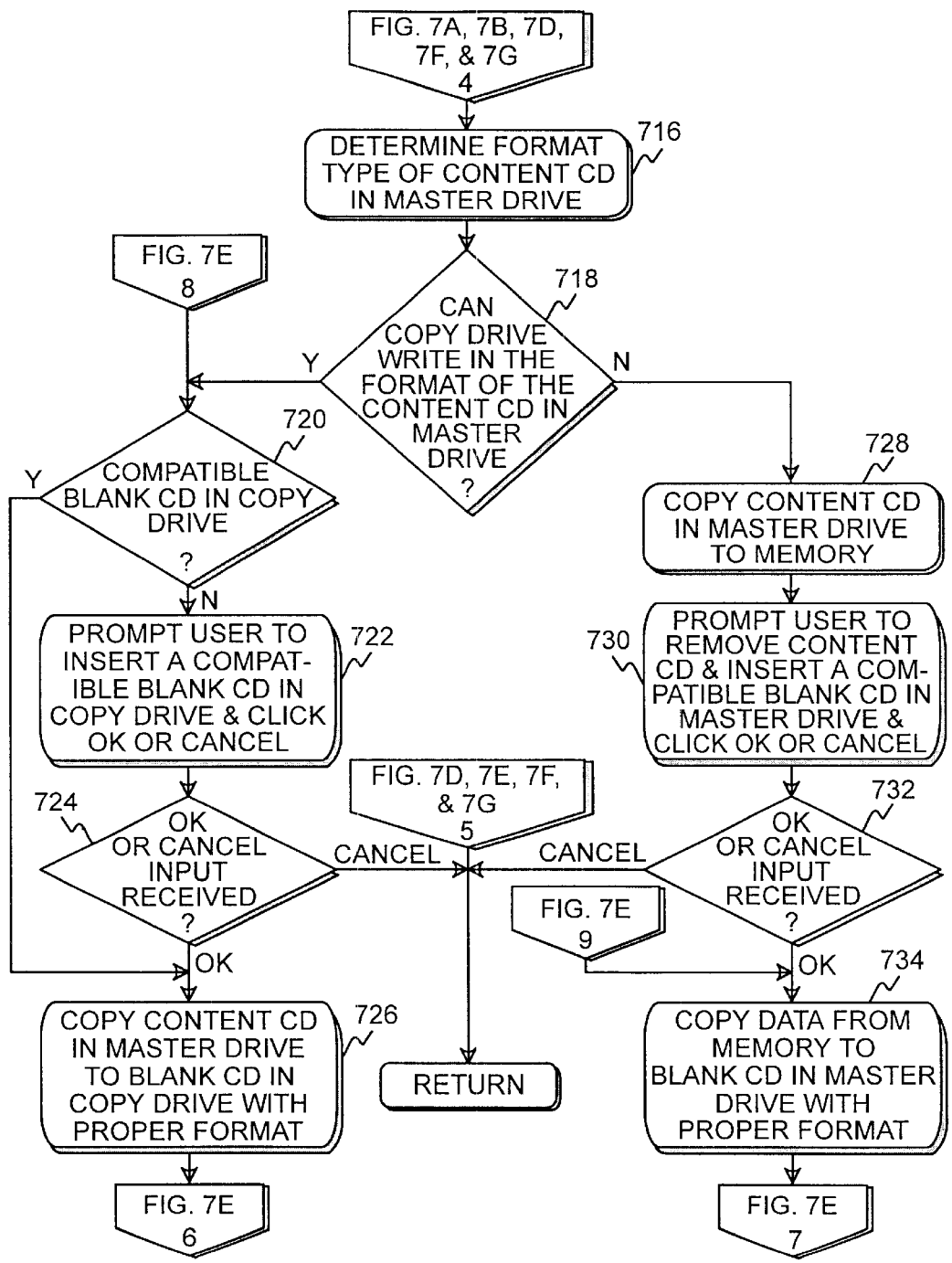
Figure 7D:
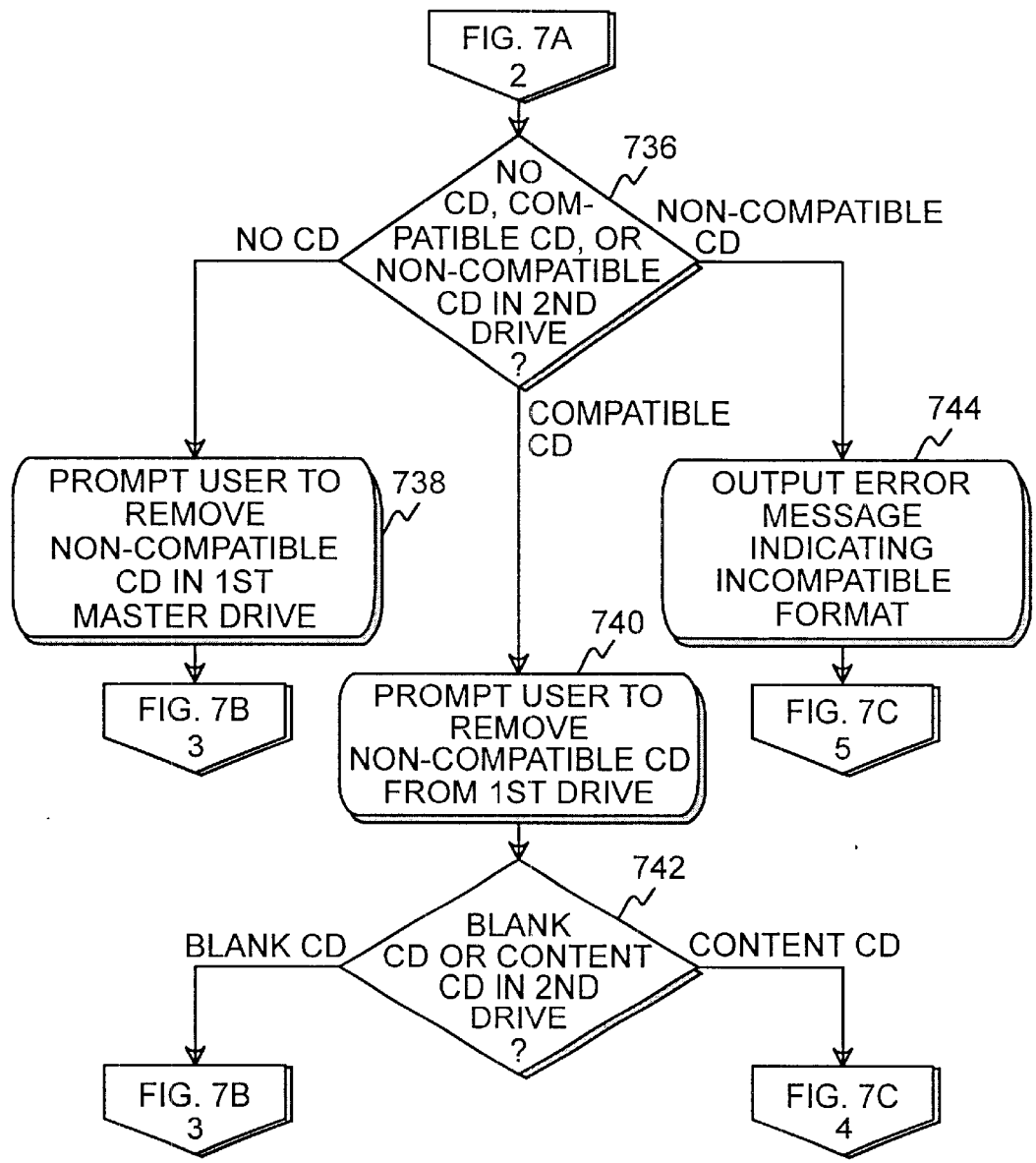

FIGS. 7A, 7B, 7C, 7D, 7E, 7F, and 7G show a flowchart of the copying process in a computer system having two CD drives where the CD drives cannot read the same format type of compact discs and at least one is a read/write compact disc drive. Referring now to FIGS. 7A, 7B, 7C, 7D, 7E, 7F, and 7G, the two CD drives may both be internal drives, external drives, or one internal drive and one external drive as shown in computer system 100 (FIG. 1). Step 700 determines if there is no CD, a compatible CD, or a non-compatible CD already inserted into the CD drive which sent the copy button down input, referred to as the first CD drive. If a non-compatible CD is detected in step 700, then control passes to step 736 (FIG. 7D). If a compatible CD is detected in step 700, then step 702 determines if the compatible CD in the first drive is a blank CD or a content CD. If a content CD is detected in the first drive in step 702, then control passes to step 716 (FIG. 7C). If a blank CD is detected in the first drive in step 702, then step 704 sends a prompt for display on graphics display 110 instructing the user to insert a compatible content CD into the second drive, now referred to as the master drive. Control then passes to step 716 (FIG. 7C).

If no CD is detected in step 700, then step 706 (FIG. 7B) determines if there is no CD, a compatible CD, or a non-compatible CD already inserted into the second drive. If no CD is detected n step 706, then control passes to step 710.

If a non-compatible CD is detected in step 706, then step 712 sends a prompt for display on graphics display 110 instructing the user to remove the non-compatible CD from the master drive, insert a compatible content CD into the master drive, and click on an OK option or a cancel option. Control then passes to step 714.

If a compatible CD is detected in step 706, then step 708 determines if the compatible CD n the second drive is a blank CD or a content CD. If a blank CD is detected in the second drive in step 708, then control passes to step 710. If a content CD is detected in the second drive in step 708, then control passes to step 716 (FIG. 6C).

Step 710, which is reached from steps 706 or 708, sends a prompt for display on graphics display 110 instructing the user to insert a compatible content CD into the first drive, now referred to as the master drive, and click on an OK option or a cancel option. Control then passes to step 714.

Step 714, which may be reached from steps 710 or 712, determines if OK input or cancel input is received. If cancel input is received in step 714, then control returns to operating system 118 (FIG. 1). One skilled in the art will recognize that in many of the steps shown in FIGS. 7A, 7B, 7C, 7D, 7E, 7F, and 7G, many opportunities for the user to click on a cancel option and exit copy software 126 are possible, but only a few are shown in FIGS. 7A, 7B, 7C, 7D, 7E, 7F, and 7G for simplicity. If OK input is received in step 714, then control passes to step 716 (FIG. 7C).

Step 716 (FIG. 7C), which may be reached from steps 702, 704, 708, 714, 742, 772, or 776, determines the format type of the content CD in the master drive. Step 718 determines if the copy drive can write data to a blank CD in the format type of the content CD in the master drive. If the answer is yes, then step 720 determines if there is a compatible blank CD already inserted into the copy drive. If yes, control passes to step 726. If the answer in step 720 is no, then step 722 sends a prompt for display on graphics display 110 instructing the user to insert a blank compatible CD into the copy drive, and click on an OK option or a cancel option. Step 724 determines if OK input or cancel input is received. If cancel input is received, then control returns to operating system 118. If OK input is received in step 724, control passes to step 726.

Figure 7E:
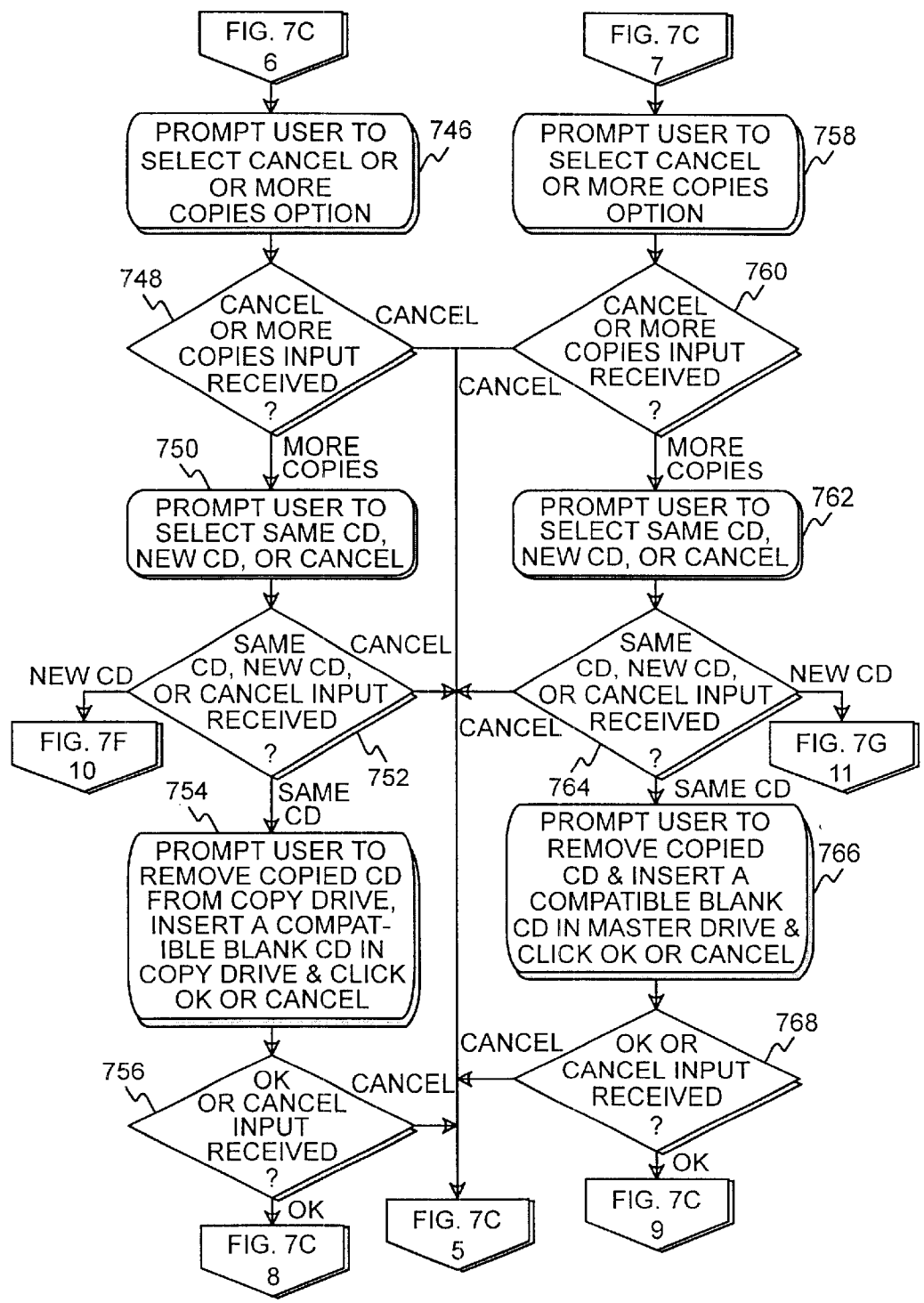

Step 726, which is reached from steps 720 or 724, copies the content CD in the master drive to the blank compatible CD in the copy drive with the proper formats. Control then passes to step 746 (FIG. 7E).

If step 718 determines that the copy drive cannot write data to a blank compatible CD in the format of the content CD in the master drive, then step 728 copies the content CD in the master drive to memory 116 (FIG. 1). Step 730 then sends a prompt for display on graphics display 110 instructing the user to remove the content CD from the master drive and insert a blank compatible CD into the master drive, and click on an OK option or a cancel option. Step 732 determines if OK input or cancel input is received. If cancel input is received, then control returns to operating system 118. If OK input is received in step 732, then step 734 copies the data in memory 116 from step 728 to the blank compatible CD in the master drive with the proper formats. Control then passes to step 758 (FIG. 7E).

Step 736 (FIG. 7D), which is reached from step 700 (FIG. 7A), determines if no CD, a compatible CD, or a non-compatible CD is already inserted into the second drive. If no CD is detected in step 736, then step 738 sends a prompt for display on graphics display 110 instructing the user to remove the non-compatible CD in the first drive, now referred to as the master drive.

Control then returns to step 710 (FIG. 7B) which sends a prompt for display on graphics display 110 instructing the user to insert a compatible content CD into the first drive, now referred to as the master drive, and click on an OK option or a cancel option. If a non-compatible CD is detected in step 736, then step 744 sends an error message for display on graphics display 110 indicating to the user that the CD has incompatible formatting, and control then returns to operating system 118.

If a compatible CD is detected in step 736, then step 740 sends a prompt for display on graphics display 110 instructing the user to remove the non-compatible CD from the first drive. Step 742 then determines if the compatible CD in the second drive is a blank CD or a content CD. If a blank CD is detected in the second drive in step 742, the second drive is now referred to as the copy drive, and control returns to step 710 (FIG. 7B) which sends a prompt for display on graphics display 110 instructing the user to insert a compatible content CD into the first drive, now referred to as the master drive, and click on an OK option or a cancel option. If a content CD is detected in the second drive in step 742, the second drive is now referred to as the master drive, and control returns to step 716 (FIG. 7C) which determines the format type of the content CD in the master drive.

Figure 7F:
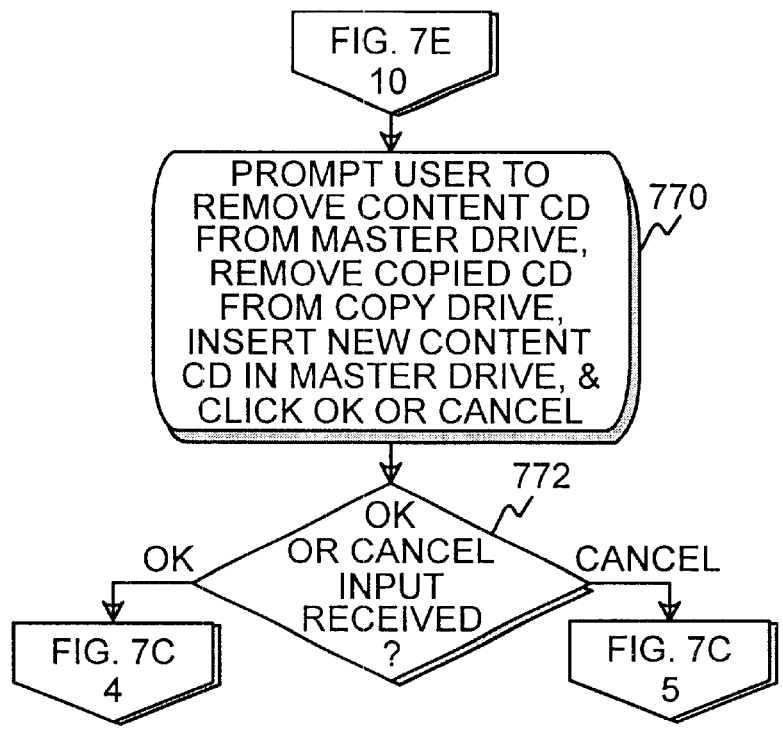

Step 746 (FIG. 7E), which is reached from step 726 (FIG. 7C), sends a prompt for display on graphics display 110 instructing the user to select a cancel or more copies option. Step 748 determines if cancel input or more copies input is received. If cancel input is received, control returns to operating system 118. If step 748 determines that more copies input is received, then step 750 sends a prompt for display on graphics display 110 instructing the user to select the same CD, a new CD, or a cancel option. Step 752 determines if same CD input, new CD input, or cancel input is received. If cancel input is received, control returns to operating system 118. If new CD input is received, control passes to step 770 (FIG. 7F). If step 752 determines that same CD input is received, then step 754 sends a prompt for display on graphics display 110 instructing the user to remove the copied CD from the copy drive, insert a blank compatible CD into the copy drive, and click on an OK option or a cancel option. Step 756 determines if OK input or cancel input is received. If cancel input is received, control returns to operating system 118. If OK input is received, control returns to step 720 (FIG. 7C) which determines if there is a compatible blank CD already inserted into the copy drive.

Figure 7G:
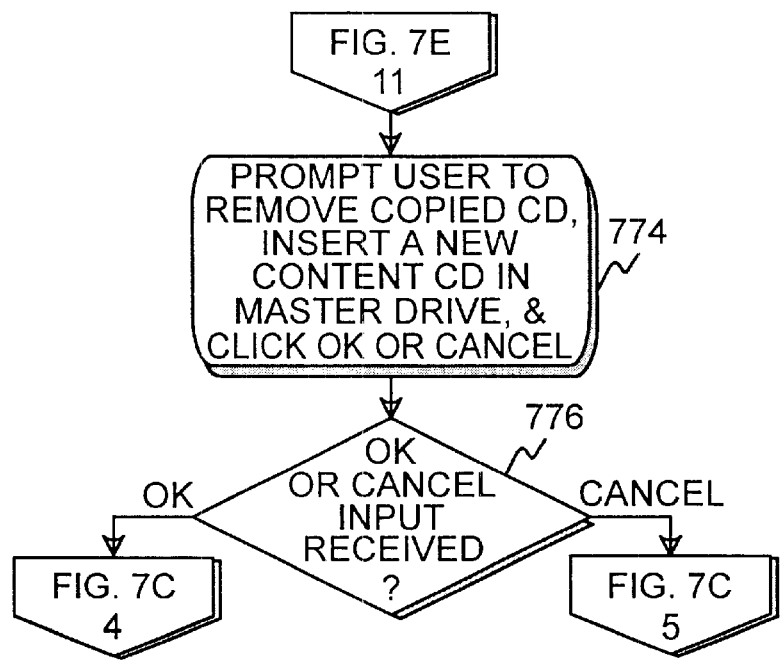

Step 758 (FIG. 7E), which is reached from step 734 (FIG. 7C), sends a prompt for display on graphics display 110 instructing the user to select a cancel or more copies option. Step 760 determines if cancel input or more copies input is received. If cancel input is received, control returns to operating system 118. If step 760 determines that more copies input is received, then step 762 sends a prompt for display on graphics display 110 instructing the user to select the same CD, a new CD, or a cancel option. Step 764 determines if same CD input, new CD input, or cancel input is received. If cancel input is received, control returns to operating system 118. If new CD input is received, control passes to step 774 (FIG. 7G). If step 764 determines that same CD input is received, then step 766 sends a prompt for display on graphics display 110 instructing the user to remove the copied CD from the master drive, insert a blank compatible CD into the master drive, and click on an OK option or a cancel option. Step 768 determines if OK input or cancel input is received. If cancel input is received, control returns to operating system 118. If OK input is received, control returns to step 734 (FIG. 7C) which copies the data in memory 116 from step 728 to the blank compatible CD in the master drive with the proper formats.

Step 770 (FIG. 7F), which is reached from step 752 (FIG. 7E), sends a prompt for display on graphics display 110 instructing the user to remove the content CD from the master drive, remove the copied CD from the copy drive, insert a new content CD in the master drive, and click on an OK option or a cancel option. Step 772 determines if OK input or cancel input is received. If cancel input is received, control returns to operating system 118. If OK input is received, control returns to step 716 (FIG. 7C) which determines the format type of the content CD in the master drive.

Step 774 (FIG. 7G), which is reached from step 764 (FIG. 7E), sends a prompt for display on graphics display 110 instructing the user to remove the copied CD from the master drive, and insert a new content CD in the master drive, and click on an OK option or a cancel option. Step 776 determines if OK input or cancel input is received. If cancel input is received, control returns to operating system 118. If OK input is received, control returns to step 716 (FIG. 7C) which determines the format type of the content CD in the master drive.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for copying a content compact disc within a computer system, said method comprising:
   (a) receiving copy button down input, from a first read/write compact disc drive, in an operating system of said computer system;
   (b) launching, by said operating system, copy software, wherein said copy software is stored in a memory in said computer system;
   (c) determining a format type of a first content compact disc present in said first read/write compact disc drive;
   (d) reading data contained on said first content compact disc and storing said data in said memory;
   (e) sending a prompt for display on a graphics display within said computer system requesting removal of said first content compact disc from said first read/write compact disc drive, and requesting insertion of a first blank compact disc within said first read/write compact disc drive; and
   (f) writing, from said memory to said first blank compact disc, said data in said format type determined in step (c), wherein after said writing, said first blank compact disc is converted to a first copied compact disc.

2. The method for copying a content compact disc within a computer system according to claim 1 wherein step (a) further comprises step (a0) performed before step (a):
   (a0) pressing at least one copy button located on said first read/write compact disc drive, wherein said pressing of said at least one copy button sends said copy button down input from said first read/write compact disc drive over a system bus to said operating system.

3. The method for copying a compact disc within a computer system according to claim 1 wherein step (b) further comprises the steps (b1) through (b3):
 (b1) determining if said first content compact disc is present within said first read/write compact disc drive;
 (b2) when said first content compact disc is not present within said first read/write compact disc drive, sending a prompt, for display on said graphics display within said computer system, requesting insertion of said first content compact disc into said first read/write compact disc drive; and
 (b3) when said first blank compact disc is present within said first read/write compact disc drive,
  (b3a) sending a prompt, for display on said graphics display within said computer system, requesting removal of said first blank compact disc from within said first read/write compact disc drive, and
  (b3b) sending a prompt, for display on said graphics display within said computer system, requesting insertion of said first content compact disc into said first read/write compact disc drive.

4. The method for copying a compact disc within a computer system according to claim 1 wherein step (c) further comprises the step (c1):
 (c1) when said first read/write compact disc drive cannot read/write in said format type determined in step (c), sending an error message, for display on said graphics display within said computer system, indicating an incompatible format.

5. The method for copying a compact disc within a computer system according to claim 1 further comprising the steps of:
 (g) receiving, from a graphical input device connected to a system bus, click input on a more copies option;
 (h) sending a prompt, for display on said graphics display within said computer system, requesting selection of a same CD option or a new CD option;
 (i) when click input is received on said same CD option,
  (i1) sending a prompt, for display on said graphics display within said computer system, requesting removal of said copied compact disc and requesting insertion of a next blank compact disc into said first read/write compact disc drive;
  (i2) repeating step (f) for said next blank compact disc; and
 (j) when click input is received on said new CD option,
  (j1) sending a prompt, for display on said graphics display within said computer system, requesting removal of said copied compact disc,
  (j2) sending a prompt, for display on said graphics display within said computer system, requesting insertion of a next content compact disc into said first read/write compact disc drive;
  (j3) repeating steps (c) through (f) for said next content compact disc.

6. The method for copying a compact disc within a computer system according to claim 1 wherein step (b) further comprises the step (b1):
 (b1) determining if a second read/write compact disc drive is present within said computer system.

7. The method for copying a compact disc within a computer system according to claim 6 wherein step (b1) further comprises the step (b1a):
 (b1a) when said second read/write compact disc drive is not present, performing steps (c) through (f).

8. The method for copying a compact disc within a computer system according to claim 6 wherein step (b1) further comprises the step (b1a):
 (b1a) when said second read/write compact disc drive is present within said computer system, determining if said first read/write compact disc drive and said second read/write compact disc drive can read a same format type of compact disc.

9. A method for copying a content compact disc within a computer system, said method comprising:
 (a) receiving copy button down input, from a first copy button located on a face of a first read/write compact disc drive, in an operating system of said computer system;
 (b) launching, by said operating system, copy software, wherein said copy software is stored in a memory in said computer system;
 (c) assuming a format type associated with said copy button;
 (d) reading the data contained on a first content compact disc present in said first read/write compact disc drive, and storing said data in said memory;
 (e) sending a prompt for display on a graphics display within said computer system requesting removal of said first content compact disc from said first read/write compact disc drive, and requesting insertion of a first blank compact disc within said first read/write compact disc drive; and
 (f) writing, from said memory to said first blank disc, said data in said format type associated with said first copy button, wherein after said writing, said first blank compact disc is converted to a first copied compact disc.

10. A method for copying a content compact disc within a computer system according to claim 9, said method further comprising:
 (g) receiving copy button down input, from a second copy button located on a face of said first read/write compact disc drive, in an operating system of said computer system;
 (h) assuming a format type associated with said second copy button;
 (I) writing, from said memory to said first blank disc, data in said format type associated with said second copy button, wherein after writing, said first blank compact disc is converted to a first copied compact disc.

11. A system for copying a compact disc, said system comprising:
 a computer system;
 a first read/write compact disc drive connected to said computer system, wherein said first read/write compact disc drive receives at least one content compact disc for reading, and said first read/write compact disc drive receives at least one blank compact disc for writing;
 copying software stored in a memory within said computer system;
 an operating system within said computer system;
 a first copy button located on a face of said first read/write compact disc drive, wherein when said first copy button is pressed, copy button down input is sent to said operating system over a system bus, wherein said operating system launches said copy software; and a graphics display connected to said computer system, wherein after said launching, said copy software determines a format type of said at least one content compact disc present in said first read/write compact disc drive, and reads data contained on said at least one content compact disc and stores said data in said memory, and further wherein said copy software sends a prompt for display on said graphics display within said computer system requesting removal of said at least one content compact disc and insertion of said at least one blank compact disc within said first read/write compact disc drive, and writes said data to said at least one blank compact disc in said format type of said at least one content compact disc.

12. The system for copying a compact disc according to claim 11 wherein after launching said copy software and said copy software determines that said at least one content compact disc is not present within said first read/write compact disc drive, said copy software sends a prompt for display on said graphics display within said computer system, requesting insertion of said at least one content compact disc into said first read/write compact disc drive.

13. The system for copying a compact disc according to claim 12 wherein when said copy software determines that said first read/write compact disc drive cannot read/write in said format type, sending an error message, for display on said graphics display within said computer system, indicating an incompatible format.

14. A system for copying a compact disc, said system comprising:

a computer system;

a first read/write compact disc drive connected to said computer system, wherein said first read/write compact disc drive receives at least one content compact disc for reading, and said first read/write compact disc drive receives at least one blank compact disc for writing;

copying software stored in a memory within said computer system;

an operating system within said computer system;

a first copy button located on a face of said first read/write compact disc drive, wherein when said first copy button is pressed, copy button down input is sent to said operating system over a system bus, wherein said operating system launches said copy software; and a graphics display connected to said computer system, wherein said copy software assumes a format type associated with said first copy button, and reads data contained on said at least one content compact disc present in said first read/write compact disc drive, and stores said data in said memory, and further wherein said copy software sends a prompt for display on a graphics display on a graphics display connected to said computer system requesting removal of said at least one content compact disc and insertion of said at least one blank compact disc within said first read/write compact disc drive, and writes said data to said at least one blank compact disc in said format type associated with said first copy button.

15. The system for copying a compact disc according to claim 14 further comprising:

a second copy button, located on said face of said first read/write compact disc drive, wherein when said second copy button is pressed, said copy button down input is sent to said operating system, wherein said operating system launches said copy software, and further wherein said copy software assumes a format type associated with said second copy button, and reads data contained on said at least one content compact disc present in said first read/write compact disc drive, and stores said data in said memory, and further wherein said copy software sends a prompt for display on a graphics display connected to said computer system requesting removal of said at least one content compact disc and insertion of said at least one blank compact disc within said first read/write compact disc drive, and writes said data to said at least one blank compact disc in said format type associated with said second copy button.

16. The system for copying a compact disc according to claim 11 further comprising:

a second read/write compact disc drive connected to said computer system; and a first copy button located on a face of said second read/write compact disc drive, wherein after said launching of said copy software, said copy software identifies the presence of said first read/write compact disc drive and said second read/write compact disc drive within said computer system, and said copy software further determines if said copy button down input came from said first copy button located on said face of said first read/write compact disc drive, or said first copy button located on said face of said second read/write compact disc drive, and said copy software further determines if at least one content compact disc is present within said first read/write compact disc drive or present within said second read/write compact disc drive.

17. The system for copying a compact disc according to claim 16 further comprising:

a second copy button located on said face of said second read/write compact disc drive, wherein when said second copy button is pressed, said copy button down input is sent to said operating system, wherein said operating system launches said copy software.

* * * * *